United States Patent [19]

Rademacher

[11] Patent Number: 5,450,938
[45] Date of Patent: Sep. 19, 1995

[54] CARD OR CASH ACTUATED VENDING MACHINE ASSEMBLY

[75] Inventor: Darrell G. Rademacher, New Port Richey, Fla.

[73] Assignee: XCP, Inc., Dryden, N.Y.

[21] Appl. No.: 236,032

[22] Filed: May 2, 1994

[51] Int. Cl.⁶ .............................. G07F 7/04; G07F 7/08
[52] U.S. Cl. ................................. 194/206; 194/217; 235/381; 364/479
[58] Field of Search ............... 194/206, 207, 210, 217, 194/218; 235/381, 383; 364/479

[56] References Cited

U.S. PATENT DOCUMENTS

| | | | |
|---|---|---|---|
| 3,840,103 | 10/1974 | Willis . | |
| 3,901,366 | 8/1975 | Schuller et al. | 194/210 |
| 3,935,933 | 2/1976 | Tanaka et al. . | |
| 4,011,433 | 3/1977 | Tateisi et al. . | |
| 4,124,109 | 11/1978 | Bissell et al. . | |
| 4,598,810 | 7/1986 | Shore et al. | 194/205 |
| 4,669,596 | 6/1987 | Capers et al. | 194/210 |
| 4,809,837 | 3/1989 | Hayashi | 194/210 X |
| 4,872,541 | 10/1989 | Hayashi | 194/217 |
| 4,879,607 | 11/1989 | Redemacher | 239/449 X |
| 4,967,896 | 11/1990 | Hara | 194/217 |
| 4,969,549 | 11/1990 | Eglise | 194/205 |
| 5,091,713 | 2/1992 | Horne et al. | 235/381 X |
| 5,132,915 | 7/1992 | Goodman | 364/479 |
| 5,147,021 | 9/1992 | Maruyama et al. | 194/217 |
| 5,225,977 | 7/1993 | Hooper et al. | 235/381 X |

*Primary Examiner*—F. J. Bartuska
*Attorney, Agent, or Firm*—Trapani & Molldrem

[57] ABSTRACT

A bank of vending machines has an associated debit card reader of vend card reader, with its associated card reader controller. The card reader controller interfaces between the money handling mechanism of one or more of the vending machines, and the vending machine controller circuitry. The vending machine controller does not connect directly to the money accepting or change making equipment. As an incentive to stimulate card purchases rather then cash purchases, the card reader controller can credit the card holder with bonus points when purchases are made. These can be discounts and added directly into the card purchase credit balance, or can be bonus points to be recorded in a separate field on the vend card, and separately redeemed.

6 Claims, 3 Drawing Sheets

CARD OR CASH ACTUATED VENDING MACHINE ASSEMBLY

BACKGROUND OF THE INVENTION

The present invention is directed to vending machines which dispense products, i.e. either goods or services, automatically in exchange for money or for value represented by indicia on a coded vend card.

The invention is more specifically direct to a vend system in which one or several vending machines and/or automatic redemption machines are controlled by a vend card reader so that purchases from any of the machines can be made by using either cash or a vend card, or both.

More particularly, several possible embodiments of the present invention relate to an accessory for use with conventional coin/currency operated single vend, multiple vend or micro-mech style vending controllers used to vend products automatically, the accessory enabling them to be manufactured or retrofitted to operate either with a vend card or with both money and a vend card.

Many varieties of automatic vending devices are in common, everyday use. These include not only machines for vending snack foods, soft drinks, or other food items, but also machines that vend services, such as vend photocopiers, pay telephones, laundry machines, and (where legal) gaming machines.

Vending machines have traditionally accepted tokens, cash (bills and coins), or more recently magnetic stripe cards. In the latter case, a vend card has an encoded magnetic stripe, and coded indicia on the magnetic stripe represent the purchase limit that a card holder is entitled to. To make a purchase, the card holder inserts the magnetic stripe vend card into a card reader, and the reader picks up and interprets the indicia on the card, and enables the associated vending machine to dispense its goods or services. When the purchase is complete, the remaining purchase credit is written back onto the magnetic stripe, and the card is returned to the purchaser.

The magnetic stripe vend card has several advantages. With the card used instead of cash, the losses due to pilferage and counterfeiting of coins, tokens, and currency are reduced markedly. Use of cards rather than cash reduces the temptation to break into the machines.

Card vend systems enable the automatic machines to reward or otherwise incentivize the purchaser to make card purchases rather than cash purchases.

In a conventional set up, a single vend card reader is associated with a single vending machine, so for a group or bank of vending machines, each machine would require its own card reader, or its own money handling mechanism. However, multiple card control devices or multiple cash handling devices require additional associated maintenance. It would be more desirable for a group or multiple of vend machines to have a central coin or bill handling device or a single card reader to serve all the machines.

A vending machine arrangement that permits either cash or vend card purchases is described in Capers et al. U.S. Pat. No. 4,669,596. In that arrangement, the card reader is mounted on a side wall of the vending machine. The card reader has a special cable connector that interposes the card reader controller between the vending machine controller and the vending machine item dispensing mechanism. For a cash purchase, the money handling unit signals the item dispensing mechanism as normal, and the machine controller signals the money handling mechanism to refund some combination of coins as change when the money deposited exceeds the price of the item dispensed.

With this arrangement, only a single vend machine can be associated with a given card reader, and money deposited in that machine enables purchases only from that machine.

A number of improved vending machines have been proposed in which purchases can be made using a credit card or cash. Typical among these are Goodman U.S. Pat. No. 5,132,915; Horne et al. U.S. Pat. No. 5,091,713; Bissell et al. U.S. Pat. No. 4,124,109; Tateisi U.S. Pat. No. 4,011,433; and Tanaka et al. U.S. Pat. No. 3,935,933. Hayeshi U.S. Pat. No. 4,809,837 describes a vending system which reads a recorded purchase value from an encoded gift certificate.

The conventional approach to combined cash vend and card vend machines is to implement a debit card or vend card reader in parallel with the money handling device of the vending machine. With such a system it is possible to interface the vend machine controller with the card reader controller so that cash inserted into the money handling device can be used to increase the money value of the vend card.

However, it is difficult to use a single vend card reader with multiple coin operated or cash operated vending machines, and it is difficult to configure such a system to provide an incentive (e.g. a reduced net price) for vend card users.

OBJECTS AND SUMMARY OF THE INVENTION

It is an object of this invention to provide a vending system that includes a single vending machine or multiple vending machines, and from which purchase can be made using either cash (coins, tokens, and/or paper currency) or a vend card that is machine readable in a card reader.

It is another object to provide a cash and vend card vending system which can be configured to provide credit or point incentives to purchasers who make purchases using a vend card rather than cash.

It is a further object to provide a vending system in which one vend machine can serve as host and can be connected to control dispensing mechanisms of additional vending machines.

According to an aspect of this invention, a vending machine or a multiple of vending machines is configurated to operate using money or using a coded card, e.g. a magnetic stripe card or a smart card containing an encoded microchip.

The vending machine has a money handling mechanism that accepts money in the form of coins or currency bills to establish a purchase credit for the purchaser. The money handling mechanism also has a change dispenser to return to the purchaser coins to equal the difference between the money deposited into the machine and the purchase price of the product vended to the purchaser. The vending machine has a product dispensing mechanism that is actuated to dispense to the purchaser a product selected by the purchaser, and a vend machine controller coupled to the product dispensing mechanism to enable the latter in response to its receiving credit signals indicative of a sufficient cash (or vend card) purchase credit to equal or exceed the purchase price of a product. The controller also generates refund signals whose value is the difference between the credit value of the credit signals just mentioned and the purchase price of the selected product vended to the purchaser.

The system card reader has a card reading mechanism to receive the purchaser's vend card and to read the credit indicia stored on it. The vend card can be a magnetic stripe card encoded with a money value and other data. However, in other embodiments, the card reader can be the type that identifies the card holder and reads a credit value from the holder's account in a central data base. Also, the card can be a smart card containing an encoded microchip rather than a magnetic stripe card. The card reader establishes a maximum purchase credit available to the purchaser, and has a card reader controller coupled to the card reading mechanism.

A first cable connects the card reader controller to the vending machine money handling mechanism and a second cable connects the card reader controller to the vending machine controller. The vending machine's money handling mechanism does not couple directly to its own controller; instead the card reader controller interfaces between them. In a preferred mode, the card reader controller mimics the vending machine coin changer, and the credit signals sent from the card reader controller to the vending machine controller are the same signals that would be sent from the coin and currency acceptor (in a cash operated machine) if some combination of coins and bills is inserted. After a purchase, the signals sent as refund signals, from the vending machine controller to the card reader controller, are on the coin changer line that would otherwise actuate the change payout from the coin tubes. The card reader controller signals the vending machine controller that the coin tubes are full, regardless of their actual status, wherever a vend card is used. This means that change is refunded to the vend card reader in increments of 0.25, then 0.10 and then 0.05, so the refund process is handled as fast as possible. This also avoids the problem of a blocked sale if any of the coin tubes is empty, since no actual coins or currency are involved in the vend card transaction.

As an incentive to purchasers to use vend cards rather than cash, the card reader controller can credit a bonus amount back to the purchaser's credit value on the vend card at the end of a card transaction. For example, a purchaser can use vend card to purchase a food item priced at 65 cents from a glass-front multi-price vending machine. After the card is inserted in the card reader, the purchasers purchase credit limit is reduced by a predetermined amount, e.g. 70 cents, from $5.00 to $4.30, and glass-front machine will display a credit of 0.70, as if 70 cents has been deposited in coins in the machine. Then the purchaser actuates the appropriate buttons or keys, and the machine delivers the desired item. As the purchase price was only 0.65, the vending machine controller pays back a credit of 0.05 to the card reader controller. Now, the card reader increments the purchase credit by 0.05 and also adds a bonus refund, for example 0.05. The card is then given total purchase credit of $4.40.

In another embodiment, the bonus amount can be in a separate numerical field, e.g. "points" rather than "money", in a separate magnetically coded area on the card stripe. The points can thus be used for special purchases or redemption.

In some embodiments, the card reader and coin and bill handling equipment can all be housed in a central kiosk for a bank of vending machines. For other embodiments the various vending machines can each have a coin or coin and bill handling capability, which are each connected to the controller for the card reader.

In certain configurations the cards can be encoded to enable some vending equipment but not others. For example, a vend card can be encoded for young children, to function for purchasing from soft drink machines or electronic game machines, but not from cigarette machines.

The signal carriers that connect the card reader and the vending equipment can be wire, radio links, infrared or optical fiber.

Purchase credit can be added to the card by depositing cash into the vending machine and actuating a refund key or lever. This causes the card reader controller to augment the purchaser's card purchase credit value, rather than release coins from the coin tubes. The card controller can be programmed to give the coded card a bonus value in addition to the amount purchased, as an incentive. Alternatively, the card controller can add points value to the points field.

The above and many other objects, features, and advantages of this invention will become apparent from the ensuing description of a preferred embodiment, to be read in conjunction with the accompanying Drawing.

DETAILED DESCRIPTION OF A PREFERRED EMBODIMENT

Figure 1:
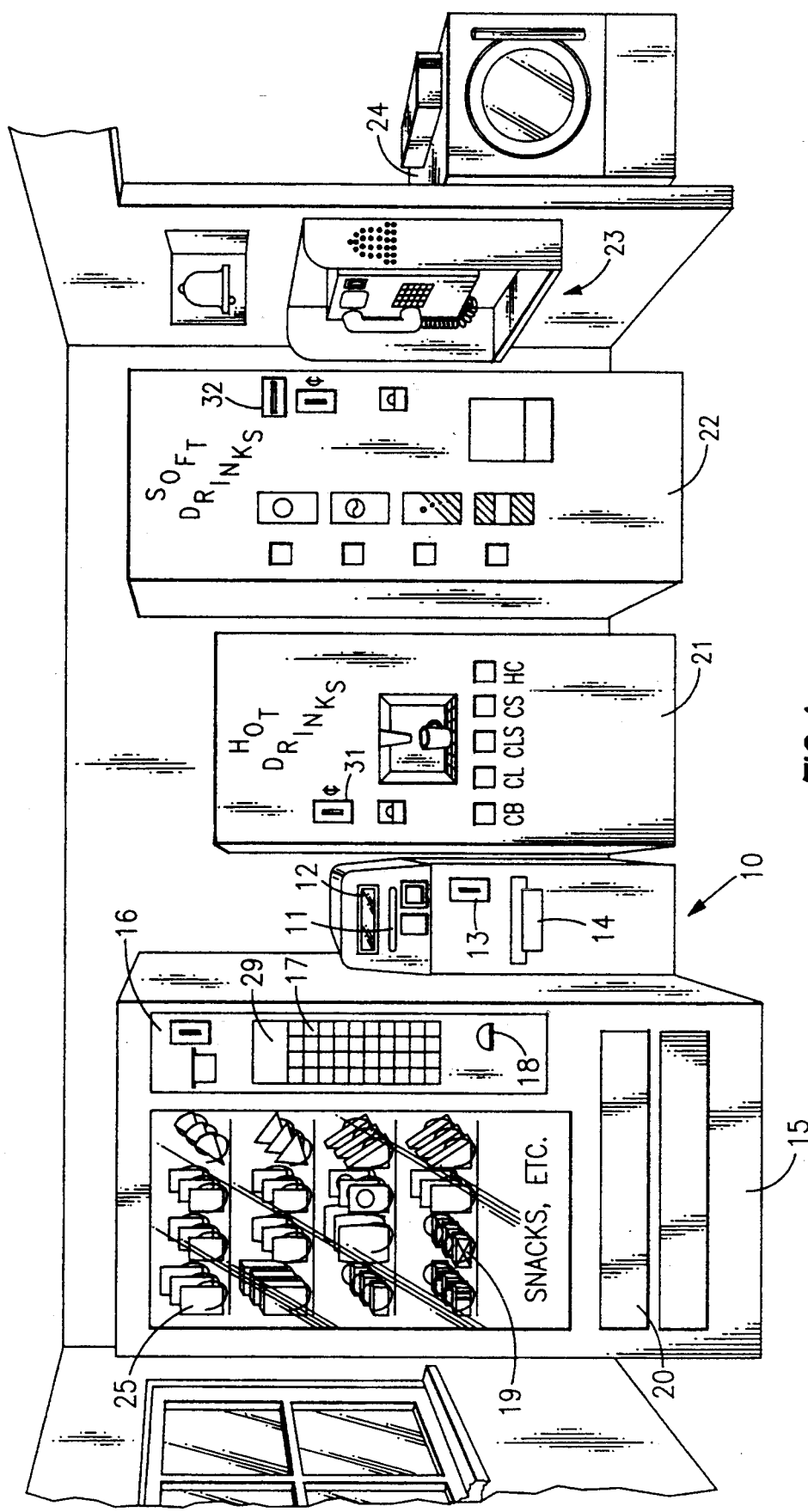
FIG. 1 is a perspective view of a bank of vending and redemption machines arranged in accordance with one embodiment of this invention.

With reference to the Drawing, FIG. 1 shows a bank of vending machines or redemption machines of the type that automatically dispense product, i.e., goods or services, when a purchaser deposits either money or a vend card that is coded with indicia that represent money. Typical vending machines are used to sell snacks and refreshments.

Here a kiosk type card reader 10 is situated in the center of the bank of machines, with a card acceptor 11 into which a vend card is inserted. The vend card can have a coded magnetic stripe, and the card reader can be, for example, the type described in U.S. Pat. No. 4,879,607, granted Nov. 7, 1989. Many other card reader configurations are possible. Above the card acceptor is an alphanumeric display 12 that displays the amount of available purchase credit, as well as other information, if desired, about the card holder's account.

In this embodiment, the kiosk for the card reader also has a coin acceptor 13 and a currency acceptor 14. These allow a card holder to insert cash in the form of coins and bills of various dominations and to increase the purchase credit of the card. As we shall see later, the money deposited here can be used to purchase products from any of the machines in the vend bank.

Alongside the card reader kiosk is a glass-front, multi-price vending machine 15 of a type that is in common use. Here the vending machine 15 has a coin and currency handling device 16 to permit a purchaser to insert bills and coins. However, this can be omitted, with a central coin and bill handling facility in the kiosk to serve this machine 15 and the others as well. The glass front machine 15 has a selector panel 17 with alphanumeric keys A–G and 1–10, to make selections A-1 through G-10. A coin return slot 18 is shown beneath the selector panel 17 for refunding coins as change to the purchaser. This machine has a bank of screw-type dispensers 19 which are visible through its glass front. Each dispenser 19 serves up one unit of merchandise for each actuation. The dispensers are identified for actuation by depressing an alpha key and a number key; for example, "D-6" can be selected to purchase a package of potato chips. The selected dispenser 19 rotates to drop the merchandise unit into a delivery trough 20. Each screw dispenser can have a respective, individual sales price, selected in five cent increments.

Other vending machines in the bank are connected by wires or cables to the glass-front vending machine 15 and to the kiosk 10. In this case, a single-price hot drink vending machine 21 dispenses coffee, tea, or hot chocolate, and a cold beverage machine 22 dispenses soft drinks in aluminum cans. These two machines 21, 22 are connected as slaves to the glass-front machine, as will be described later.

In so-called bottle-law states, where a redeemable deposit (e.g. five cents) is collected for each soft drink container, a can redemption feature can be included in the vending machine 22.

Also shown here are a pay telephone 23 and a coin laundry machine 24, which stand as examples of a few of the many possible and varied types of vending or redemption devices which automatically dispense a service product. Other examples are a music player or juke box, or, where legal, a gaming machine such as a blackjack or video draw poker machine.

Figure 2:
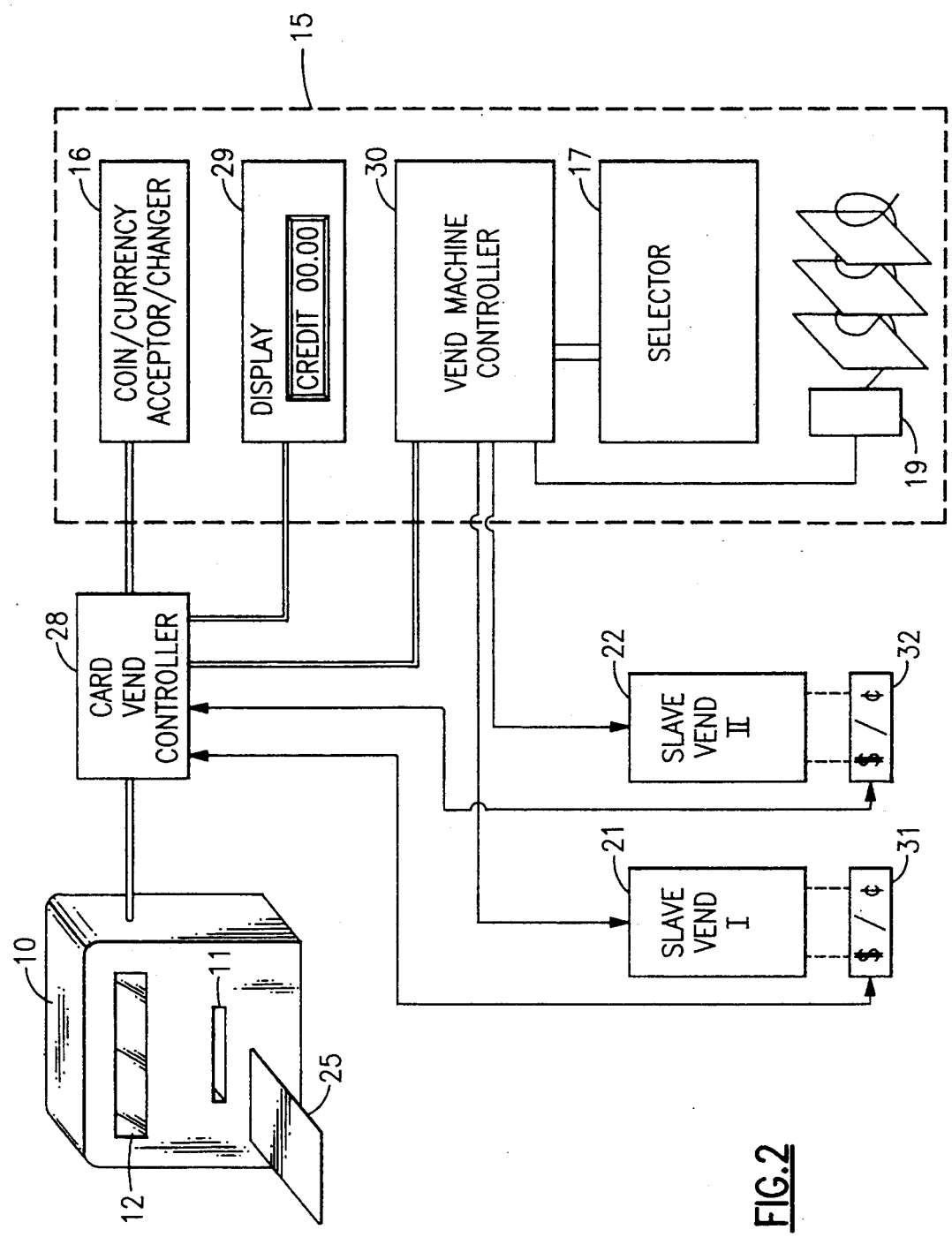
FIG. 2 is a simplified schematic view of the combination cash and card vend system of this embodiment.

As shown in FIG. 2, the kiosk 10 is adapted to receive a coded vend card 25. In this case the card 25 has a magnetic stripe coded with the purchase value that is available to the card holder. As is the practice in the industry, the magnetic stripe is also coded with cardholder identification, and with special characters to prevent counterfeiting or card misuse.

The card 25 is inserted into the card slot 11 on the front of the card reader kiosk. A magnetic read/write head within the reader picks up coded information from the magnetic stripe, and the characters are interpreted in the reader. Then the card reader display 12 on the front of the kiosk 10 displays the maximum purchase credit available to the cardholder. This purchase credit is used for purchasing merchandise or services from the various vending machines, and at the end of the last transaction, the card reader ejects the card 25 out the slot 11. During the ejection of the card, the card reader records on the stripe the cardholder's updated purchase credit.

As further shown in FIG. 2, a card vend controller 28, i.e. an electronic circuit board, is connected to the card reader. The controller 28 has a line or cable connecting it to the coin and currency acceptor and changes mechanism 16 in the glass front vending machine 15. The card reader controller 28 is also connected to a display 29 in the machine 15 and to a vend controller 30, i.e., a controller circuit board, within the glass front vending machine 15. The vend machine controller 30 is connected to the selector panel 17 and to the product dispensers 19.

The display 29 indicates the purchase credit value available on the vending machine 15, corresponding either to the sum of money deposited into the money handling mechanism 16 or to the fund value transferred to the vending machine controller 30 from the card reader controller 28.

Here, the vending machine controller 30 is connected to the card reader controller 28 and not to the money handling mechanism 16 of the machine 15. All purchase transactions, whether by cash or vend card, are handled by the vend card reader controller 28.

As shown schematically here, the hot drink vending machine 21 and the cold drink vending machine 22 are connected by wire to the controller 30 of the glass front vending machine 15. In this case, a purchaser can actuate a key combination on the selector panel 17, e.g. "G-9" or "G-10", that is not associated with any of the product dispensers 19. The controller 30 sends a signal to the appropriate one of the single price vending machines 21, 22. The signal actuates a relay to mimic a deposit of correct change into the machine to enable it to vend a hot drink or a can of cold soft drink.

Associated money handling units 31, 32 of the single price machines 21, 22 are connected to the card reader controller 28 and are not directly connected to the controller or dispenser mechanisms of the respective single price machines.

Figure 3:
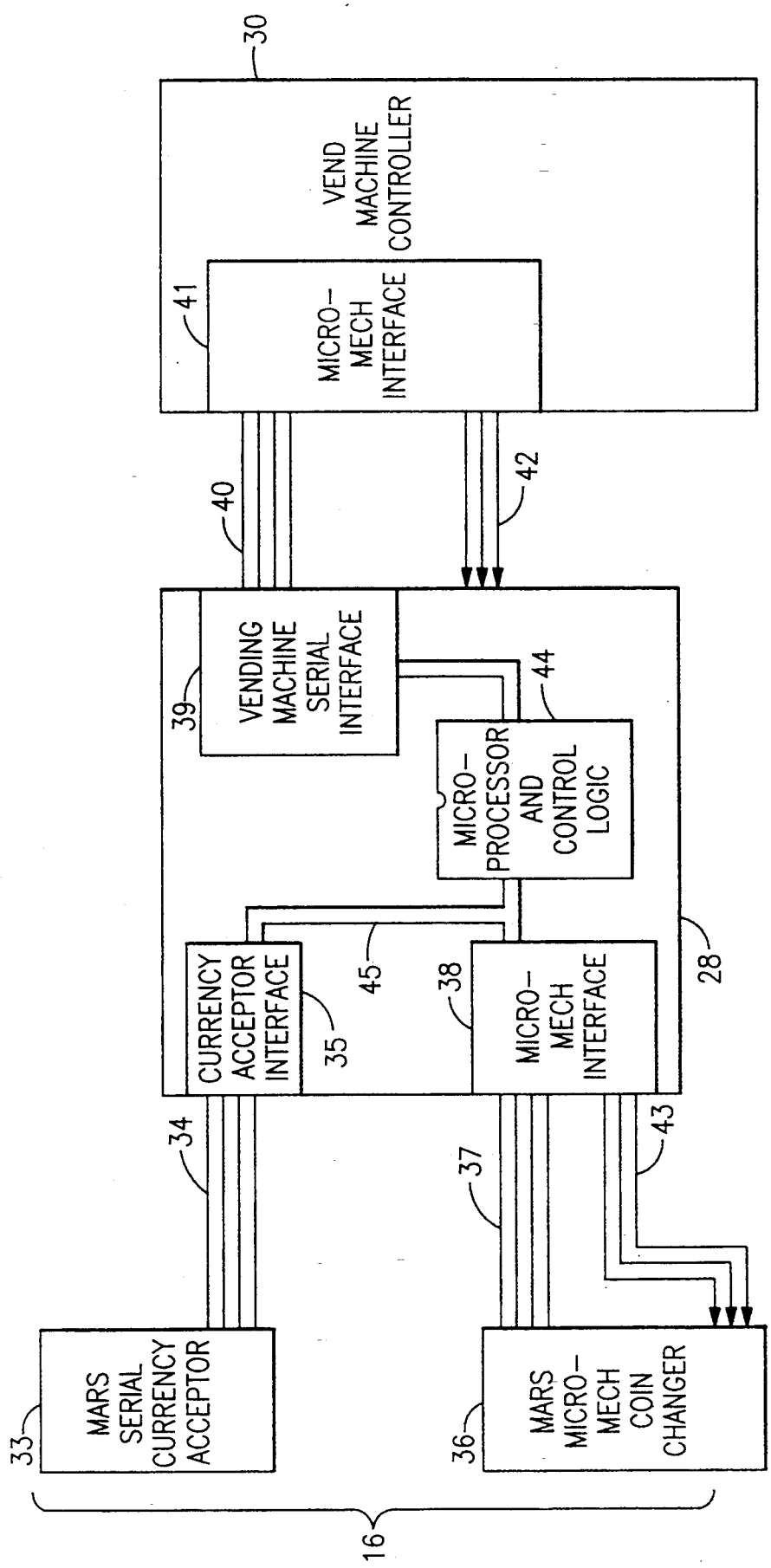
FIG. 3 is a schematic view showing the card reader controller configuration of this embodiment.

FIG. 3 schematically illustrates the architecture of the card reader controller 28 and its interfaces with the money handling mechanism 16 and vending machine controller 30. The vending machine money handling mechanism 16 has a serial currency acceptor 33 which follows the MARS protocol. This protocol is a standard within the industry. The currency acceptor 33 is coupled by a cable 34 to a currency acceptor interface 35 in the controller 28. The cable 34 has at least four conductors, i.e., a send line, a data line, an interrupt line and an accept enable line. A coin acceptor and changer 36 is configured to the MARS micro-mech protocol, and has a cable 37 with send, data, interrupt and accept enable lines that connect to a micro-mech interface 38 in the controller 28.

The controller 28 has a vending machine serial interface 39 connected by a four-line cable 40 to a corresponding micro-mech interface 41 in the vending machine controller 30.

A coin dispense cable 42 has 0.25-dispense-enable, 0.10-dispense-enable, and 0.05-dispense-enable lines connecting the micro-mech interface 41 of the vending machine controller 30 back to the vending machine serial interface 39 of the card reader controller 28. A similar coin dispense enable cable 43 connects the micro-mech interface 38 back to the coin acceptor and changer 36.

Within the controller 28 is a microprocessor and control logic circuit 44, and a data and signal bus network 45 that connects the circuit 44 with the respective interfaces 34, 38 and 39.

While FIG. 3 shows the money handling mechanism 16 from a single vending or redemption machine only and the controller 30 from a single machine, many other vending or redemption machines can be interfaced to the card reader controller 28.

FIG. 3 has been drawn, for reasons of simplicity, to show only a few representative elements. Of course any number of vending or redemption machines, single price or multi-price, could be coupled to the card reader controller 28.

In operation, a customer or patron can operate any of the vending or automatic redemption devices in this bank of vending machines using either the vend card 25, or cash (coins and/or bills), or some combination of both the vend card and cash. Cash purchases are made in the same manner as with conventional coin and currency operated machines.

If a patron wants to purchase one or more items using the card 25, he or she inserts the card into the card reader 10. For example, the card 25 can bear a five dollar purchase credit value, and the card reader display will show "CREDIT-S005.00", at least momentarily.

In order to operate the self-service glass-front machine 15, the card reader controller 28 sends signals to the vending machine controller 30 that mimic quarters, nickels, and dimes being deposited into the associated money handling mechanism 16. In this example, the controller transfers seventy cents of value which represents, for example, the purchase price of the most expensive item in the machine 15.

The controller 28 debits the card purchase credit 0.70, and after momentarily flashing "$005.00", the display 12 indicates a reduced value, "$004.30". The vending machine display 29 now shows "00.70" and the machine is conditioned for the purchaser to make a selection.

The self-service glass front multi-price multi-vend machine 15 can vend items of various prices, for example from 30 cents to 70 cents. The purchaser enters a selection on the selector panel 17, for example, to purchase a bag of potato chips at a price of fifty cents. This actuates the appropriate screw vend dispenser 19, and the bag of chips falls into the trough and is removed by the purchaser.

The vending machine display now shows a credit of twenty cents, and the controller 30 then sends out signals, from the micro-mech interface 41, as coin dispense signals to return twenty cents to the purchaser. However, as described before, the coin dispense lines 42 go to the vending machine interface 39 of the vending machine controller 28, not to the coin changer 36. The controller 28 intercepts the coin return signals, and sends back a handshake signal to the controller 30 to signify that the twenty cents has been paid out. The vend card reader controller 28 now adds this twenty cents to the credit balance of $4.30, and the display shows the updated value of "$004.50". The card reader writes this updated value back to the magnetic stripe and ejects the vend card from the card slot 11 when the purchaser pushes the card eject button.

If the remaining purchase credit balance on the card 25 is low, the purchaser can add value to it by inserting coins and currency in the glass front machine as if to make a purchase. For example, the purchaser may insert sufficient currency bills and coins to total five dollars, and the glass front machine display will indicate such value "05.00". Next, the purchaser inserts the vend card 25, which can have some residual credit balance from $000.00 to $999.99. In this example, the card credit balance can be $4.50. The card reader display 12 flashes "$004.50" and then shows "$003.80" as 70 cents is transferred to the glass front machine 15, as previously described. The glass-front machine display 29 now shows a purchase credit "05.70". The cardholder purchaser then depresses the eject button on the card reader, and the credit of $5.70 is returned to the card reader controller 28. In this example, the credit balances of $5.70 and $3.80 are combined in the controller, and the updated combined sum $9.50 is written back onto the card strip as the card is discharged out the slot 11.

Incidentally, if the card purchase credit balance is less than the highest purchase price, e.g. if there is only thirty cents remaining, the controller 28 will transfer that amount to the vending machine controller 30. Purchases are limited to items of that price or less, or the card balance can be increased as just described.

The unused selections on the glass-front machine 15 can be used to simulate deposit of coins in other machines, such as the telephone 23 or laundry machine 24, e.g. to simulate deposit of 25 cents or 50 cents, respectively. In either case, the glass-front machine 15 transmits a 24-volt signal over a wire pair to an unused selection port on the telephone 23 or laundry machine 24. This 24 volt signal is present for one to two seconds, and can actuate a timer circuit, such as a 556 timer, that outputs a 50 millisecond signal to pull a relay closed in the telephone or other vending machine. In this case, the dry switch closure can be connected in parallel with the coin switch of the telephone or other vending machine. The momentary switch closure is interpreted as a 25 cents switch closure (in the telephone) and permits a local phone call to be dialed. In the event that the phone call cannot be completed, the pay telephone signals a coin return signal back to the vending machine 15, and a credit of 0.25 is restored to the purchase credit balance.

As an incentive for purchasers to use vend cards rather than cash, either points or money credit can be awarded to card holders for making card purchases. That is, as the vend card 25 is used to make purchases, points are added to the cardholder's debit account balance. The points are stored in memory of the card reader controller and at the end of a transaction or series of transactions the points are recorded. In this example, the points can be awarded by magnetically recording same on the card 25. However, in other card systems, where the card holder's account information is stored at a central database, the card holder points are stored on a magnetic hard disk drive or other memory device. The points can be added back to the purchaser's credit balance, i.e. as a discount to reduce the effective purchase price. Alternatively, the points can be recorded in a separate field from the money credit balance, and can later be separately redeemed for services or merchandise.

For an example of refund credit, a card holder can purchase a bag of potato chips, priced at 50 cents, from the glass front vending machine 15, in the manner described above. The card reader controller 28 recognizes this as a card purchase. In addition to the refund of 20 cents, i.e. change from the original transfer of 70 cents, a bonus refund of ten percent is awarded. For this example, this means a refund of an extra 0.05. The purchase credit balance is updated as 4.55 so the net purchase price becomes 45 cents for the card transaction, as against 50 cents for the corresponding cash transaction. The return of discount can be any desired percentage of the purchase price, i.e. from zero to two hundred percent of the vend price. Alternatively, the discount can be a fixed amount, e.g. a 10 cent refund regardless of vend price. The refund can be an odd number of cents (e.g. three cents or seven cents), or even fractional cents.

Bonus points can be awarded in a separate points account as an incentive to make card purchases. For example, a credit of five points can be awarded for each purchase from the machines 15, 21, 22 etc. where the vend card 25 was used. A separate redemption machine (not shown here) can redeem these points for other service or merchandise. For the magnetic stripe cards 25, the money credit and point credit can be recorded in successive fields on the magnetic stripe.

If the card 25 having a purchase credit balance of $5.00 and a point balance of 1.00 is inserted into the card reader, the display 12 will flash "CR 005.00 PT 001.00" and then 70 cents will be transferred to the machine 15. The display 12 will then show "CR 004.30 PT 001.00" and the glass front machine display 29 will show "00.70". The purchaser selects a 50 cent item, as before, and the machine 15 signals to refund 20 cents change. The change return signals are intercepted by the controller 28, which adds 20 cents to the credit balance and 5 points to the bonus point balance. When the card 25 is ejected, the reader records updated values on the card, and these are flashed on the display 12 as "CR 004.50 PT 001.05". The bonus points continue to accumulate until redeemed.

For persons not having a vend card, the glass-front machine 15 can dispense such cards 25 as one selection. These can be provided with some minimum credit balance, or with a zero balance, as desired. The credit balance can be augmented as described above.

The card reader 10 can be adapted to permit the purchaser to make a succession of purchases, and return the card 25 only after depressing a reject button. Alternatively, the reader 10 can be adapted to update and return the card after each purchase.

In the embodiment described above, after a vend or selection is finished, change value is returned from the host vending machine 15 to the card reader controller 28 using a MARS protocol. For the U.S. this means signal are sent along the coin dispense line 42 to signify quarters, dimes, and nickels. In other countries, there would be appropriate coin dispense lines to correspond to the coinage in use. For example, in Canada a dollar coin is used as a fourth coin denomination, and would be accepted in many machines.

In order to speed up the crediting of change, the card controller 28 signals to the vending machine controller 30 that the change payout tubes of the coin changer 36 are all "full". This allows the controller 30 to refund unused purchase credit in increments of 25 cents, 10 cents, and 5 cents. Credit payout occurs in the smallest amount of time.

While this embodiment shows a separate kiosk 10 for accepting the vend card, the card reader could instead be built into the host glass-front machine 15 or one of the other machines. Also, the card reader controller 28 could be installed either inside the kiosk 10 or else inside the host vending machine 15, depending on considerations of space, power availability, and the like.

In the above description, a micro-mech coin vend mechanism is employed that can make change before or after a vend is complete. However, this invention is not limited to that style of vending mechanism. The vending accessory feature of this invention can be used with single vend coin mechanisms, either with or without change return, or any multiple vend coin mechanism that does or does not make change. In many machines, exact change is required and there is no return of change. Examples are some telephones, cigarette machines, snack machines, copiers, and automatic parking mechanisms (which can employ coins or tokens).

The invention has been described here in terms of a preferred embodiment. However, this embodiment is offered only as an example of many possible applications. Many modifications and variations are possible without departing from the scope and spirit of this invention, as defined in the appended claims.

What is claimed is:

1. A coin vending and card vending assembly comprising:

a vending machine which includes money handling means for accepting money in the form of coins or bills and establishing a purchase credit, said money handling means including means for dispensing money as change after a purchase, means for generating credit signals whose value indicates the level of said purchase credit established by said money handling means and means for receiving refund signals whose value after a purchase corresponds to a difference between said established purchase credit and a predetermined purchase price of a product selected by a purchaser; product dispensing means for dispensing to the purchaser the product selected by the purchaser; and a vend machine controller coupled to said product dispensing means to enable same in response to receiving credit signals of sufficient value to equal or exceed the purchase price of the product and for generating refund signals whose value is the difference between said credit signals value and the purchase price of said selected product;

and a card reader which includes a card reading mechanism that receives a vending card that contains readable indicia; means to ascertain a maximum purchase credit available to a purchaser in possession of the vending card; and a card reader controller coupled to said card reader mechanism;

first signal carrier means coupled between said money handling means and said card reader controller for bringing purchase credit signals from the money handling means to the card reader controller and bringing refund signals from said card reader controller to said money handling means;

second signal carrier means coupled between said card reader controller and said vend machine controller for bringing purchase credit signals from the card reader controller to the vend machine controller and for bringing refund signals from the vend machine controller to the card reader controller;

said card reader controller being configured such that:

when a purchaser inserts the vend card into said card reading mechanism said card reader controller establishes the available purchase credit, reduces said available purchase credit by a predetermined amount, and transmits to the vend machine controller credit signals corresponding to said predetermined amount so that the vend machine controller enables said vend mechanism to dispense a selected product, and said vend machine controller sends to said card reader controller refund signals corresponding to a difference between said predetermined amount and the purchase price of said selected product, and said card reader controller adds the value represented by said refund signal back to said available purchase credit; and when the purchaser does not insert a vend card into the card reading mechanism, the card reader controller transmits to the vend machine controller on said second carrier means the credit signals received on said first carrier means from said money handling means; and said card reader controller sends on said first carrier means to said money handling means refund signals received on said second carrier means from said vend machine controller.

2. Coin vending and card vending assembly according to claim 1 wherein said vending machine is a multi-selection, multi-price vending machine having a plurality of selectors for selecting products to be purchased, with respective purchase prices between a minimum price and a maximum purchase price; and said card reader controller transmits said credit signals corresponding to said maximum purchase price to said vend machine controller.

3. Coin vending and card vending assembly according to claim 2 further comprising at least one additional vending machine, and a signal carrier connected between said multi-selection multi-price machine and said additional machine such that an actuation of a predetermined one of said selectors conditions the additional vending machine to dispense a product.

4. Coin vending and card vending assembly according to claim 1 wherein said card reader controller includes means to compute a bonus credit when the purchaser has inserted said card into the card reading mechanism and has made a purchase.

5. Coin vending and card vending assembly according to claim 4 wherein said card reading mechanism records said bonus credit in a field separate from said available purchase credit.

6. Coin vending and card vending assembly according to claim 4 wherein said card reader controller combines said bonus credit with said available purchase credit as a card-use incentive discount.

* * * * *